United States Patent [19]
Compton et al.

[11] Patent Number: 6,115,035
[45] Date of Patent: Sep. 5, 2000

[54] SYSTEM AND METHOD FOR AUTOMATED AUDIO/VIDEO ARCHIVE AND DISTRIBUTION

[75] Inventors: Charles L. Compton, Cambridge; Gene Walter, Watertown; James McElhiney, Cambridge, all of Mass.

[73] Assignees: MediaOne Group, Inc., Englewood; U S West, Inc., Denver, both of Colo.

[21] Appl. No.: 08/897,746

[22] Filed: Jul. 21, 1997

[51] Int. Cl.[7] .................................................. H04N 7/10
[52] U.S. Cl. .......................... 345/327; 709/217; 348/12
[58] Field of Search ............................. 348/6, 7, 10, 12, 348/13; 455/3.1, 5.1, 5.2; 709/217, 218, 219; 345/327

[56] References Cited

U.S. PATENT DOCUMENTS

| | | |
|---|---|---|
| 5,790,806 | 8/1998 | Koperda . |
| 5,793,980 | 8/1998 | Glaser et al. . |
| 5,805,815 | 9/1998 | Hill . |
| 5,832,499 | 11/1998 | Gustman ................................ 707/103 |
| 5,835,667 | 11/1998 | Waclar et al. .............................. 386/96 |
| 5,838,927 | 11/1998 | Gillon et al. . |
| 5,870,552 | 2/1999 | Dozier et al. . |
| 5,870,754 | 2/1999 | Dimitrova et al. ...................... 707/104 |

OTHER PUBLICATIONS

Internet CNN NEWSROOM The Design of a Digital Video News Magazine by Charles L. Compton—May 1995.

*Primary Examiner*—Nathan Flynn
*Attorney, Agent, or Firm*—Brooks & Kushman P.C.

[57] ABSTRACT

A digital audio/video archive and distribution system (10) and method utilize a signal capture and compression encoding subsystem (12) to translate an analog signal from at least one media source (14) into at least one digital signal segment. The digital signal segment is automatically correlated with identifying information (18) input via an Internet connection, and both are stored in a searchable database subsystem (24). Upon a user request (28) received via an Internet connection, or programming prompt, a graphical user interface (GUI), such as a web-based user interface, is created to distribute one or more of the stored digital signal segments.

4 Claims, 5 Drawing Sheets

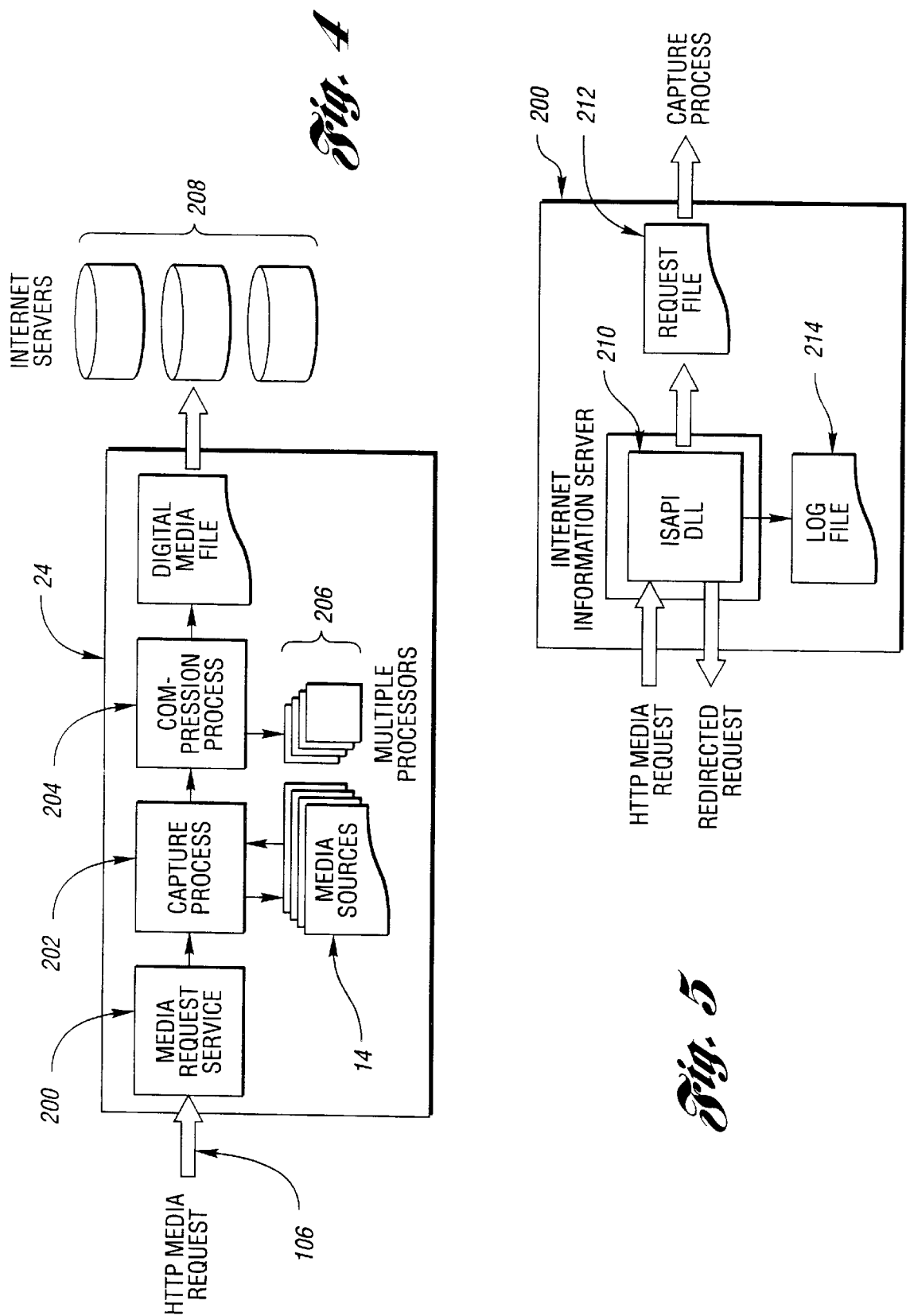

SYSTEM AND METHOD FOR AUTOMATED AUDIO/VIDEO ARCHIVE AND DISTRIBUTION

TECHNICAL FIELD

The present invention relates to audio/video distribution systems, and more particularly to improvements in processing and archival of digital audio and video signals for subsequent distribution to an end user.

BACKGROUND ART

High-speed data networks open up new opportunities to provide users with content previously too bandwidth-intensive for common use. Network-delivered digital video is an example of this type of content. Even though digital video is possible on high-speed data networks, applications that take advantage of it must be selected carefully. In general, traditional analog video distribution channels are far more efficient than today's personal computer (PC) based video systems. Only applications that leverage "digital manipulation," such as random access, searching, etc., are commercially attractive when compared to video distribution via traditional means.

For example, a classroom environment is an ideally suited application for such a digital video distribution network because of the readily accessible and potentially boundless information resource tool provided thereby. More specifically, student interest can be heightened and learning accentuated if a teacher is provided with the capability of easy and instantaneous access to video information relating to a multitude of different topics. Another ideally suited application is for a an Internet based news service which fully integrates video clips with the associated news stories. Numerous other applications could be enhanced if utilized in conjunction with a digital video distribution system. The same is true for distribution of digital audio with or without a video signal component.

However, known distribution arrangements have not proven satisfactory because such arrangements have generally been unable to adequately re-purpose or translate analog/digital signal information content so as to produce an easily searchable and accessible archive database. In other words, inefficient data input and storage processing and formatting have heretofore limited the usefulness of digital information distribution systems. Thus, a need exists for a digital audio/video archive and distribution system which can repurpose analog signal content to provide easy and flexible output to end user terminals.

DISCLOSURE OF THE INVENTION

It is therefore an object of the present invention to provide an improved method and system for distribution of digital audio and digital video information which automatically translates and archives analog signal content for subsequent reproduction when desired.

It is another object of the present invention to provide a method and system for distribution of digital video information which translates analog audio and video content into corresponding digital audio or video segments which can then be stored in an easily searchable database.

It is a further object of the present invention to provide a method and system for distribution of digital audio and video information which translates analog signal content into corresponding digital audio or video segments, archives the digital segments in a searchable database, and reproduces requested digital segments on a broadband communication media when prompted.

It is yet another object of the present invention to provide a method and system for distribution of digital audio and video information which captures analog signal content from a plurality of media sources, translates the captured signal content into digital segments, and reproduces the digital segments for output on a graphical user interface (GUI), such as web pages which can be accessed via a web-based GUI user interface.

In accordance with these and other objects, the present invention provides a method for distributing digital audio or video information including translating an input analog signal into at least one digital signal segment and automatically correlating the at least one signal segment with identifying data received from an Internet connection. The method further includes storing the correlated at least one signal segment and identifying data in a storage device. The method further includes selecting at least one stored signal segment for distribution to a user terminal when prompted, such as by receiving a request for distribution over an Internet connection, or through a programming input. The at least one selected signal segment is formatted for output on an Internet connection, and is sent to the user terminal via the Internet connection.

In accordance with another aspect of the present invention, a system for distributing digital audio or video information comprises a signal capture processor for translating an input analog signal into at least one digital signal segment, a control processor operative to automatically correlate the at least one signal segment with identifying data received from an Internet connection, and a storage device connected to the control processor for storing the correlated at least one video segment and identifying data. The control processor includes a distribution output generator for formatting and sending the at least one selected signal segment to a user terminal via an Internet communication system. The system further comprises a user input connected to the Internet communication system for allowing a user terminal to select the desired at least one stored signal segment to be distributed.

In accordance with other aspects of the present invention, the method and system can include compressing the at least one digital video segment, distributing the selected signal segments using a broadband communication system, or through a graphical user interface (GUI) type interface, such as a web-based interface, via a broadband communication system, and creating a file directory protocol which facilitates both the correlation of the at least one digital signal segment with any associated files, such as a corresponding text file, and the ability to store the at least one signal segment in a searchable database.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 4 is a block diagram showing the video capture and compression encoding subsystem of FIG. 1;

FIG. 5 is a block diagram of the media request service of FIG. 4;

BEST MODE FOR CARRYING OUT THE INVENTION

Figure 1:
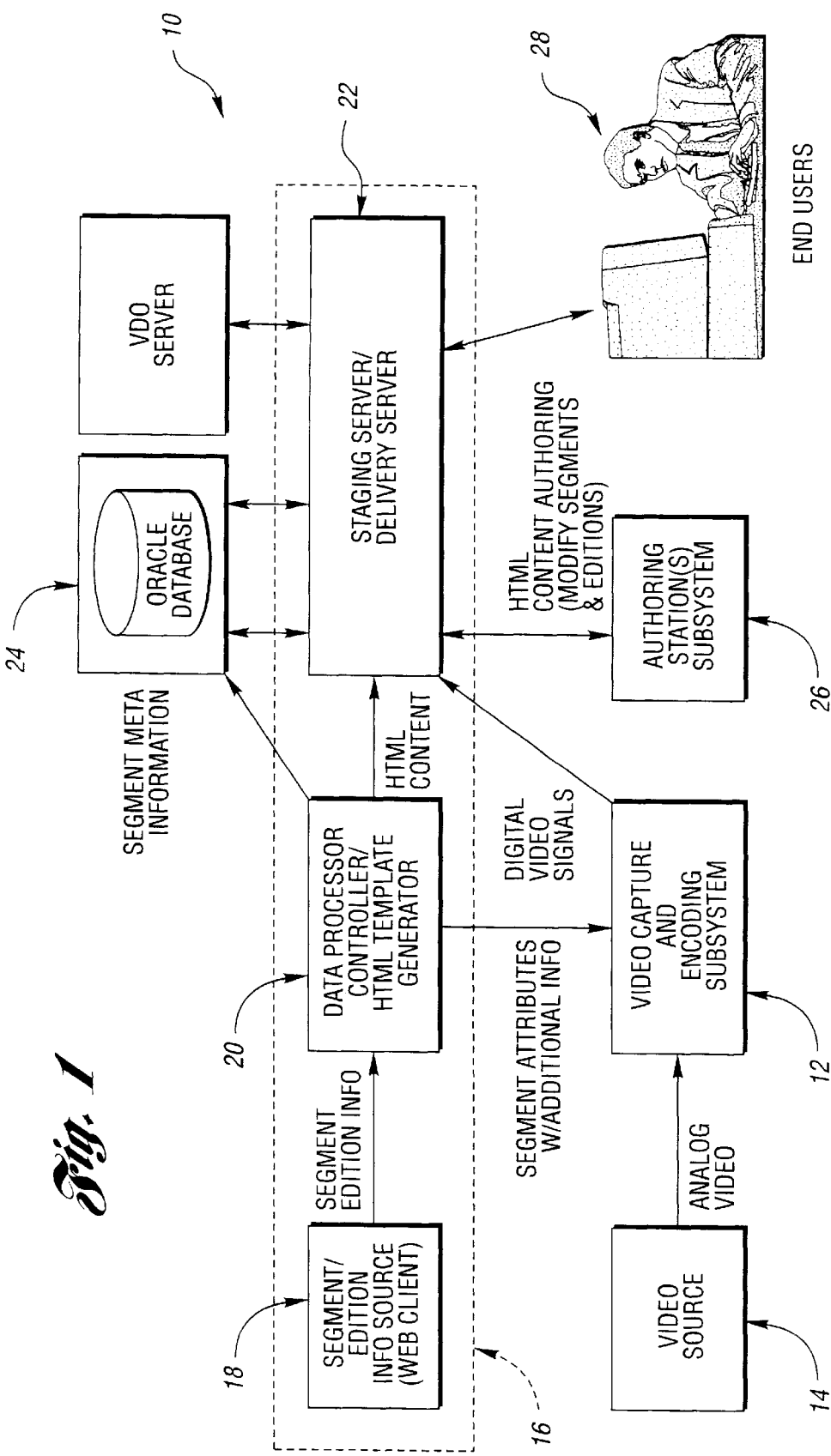
FIG. 1 is a block diagram of a digital video archive and distribution system in accordance with the present invention.

FIG. 1 shows a block diagram for a digital audio/video archive and distribution system 10 in accordance with a preferred embodiment of the present invention. While the preferred embodiment is described hereinbelow in context with capturing, archiving, and distributing video signal components, the present invention is readily applicable to distribution of audio-only signals, or a combination of audio and video signal components. Thus, the preferred embodiment is not limited solely to processing of video signal components.

As shown, system 10 includes a video capture and encoding subsystem 12 which receives analog video signals from at least one multimedia device 14, such as a video tape player, satellite receive, camera, or the like. As more fully described below, video capture and encoding subsystem 12 includes suitable programming for automatically dividing any received analog signal into one or more corresponding digital video segments, which are subsequently supplied to a central processing subsystem 16. Central processing subsystem 16 generally includes video segment information generator 18 connected to a data control processor 20, and a video staging and delivery server 22.

System 10 further includes a digital video database storage subsystem 24 connected to central processing subsystem 16 for storing as a retrievable archive each digital video segment generated by capture and encoding subsystem 12. More specifically, while not to be construed as limiting, the actual digitized signals can be stored in a UNIX file system, while pointers to the respective UNIX files can be stored in subsystem 24. In addition, an authorizing subsystem 26 is connected to the staging and delivery server 22 of central processing subsystem 16 for allowing editing and production oversight of digital video information ultimately distributed to an end user 28. Finally, a video (e.g., VDO) server 30 is connected to the staging and delivery server 22 to serve streamed video clips to website viewers.

Figure 2:
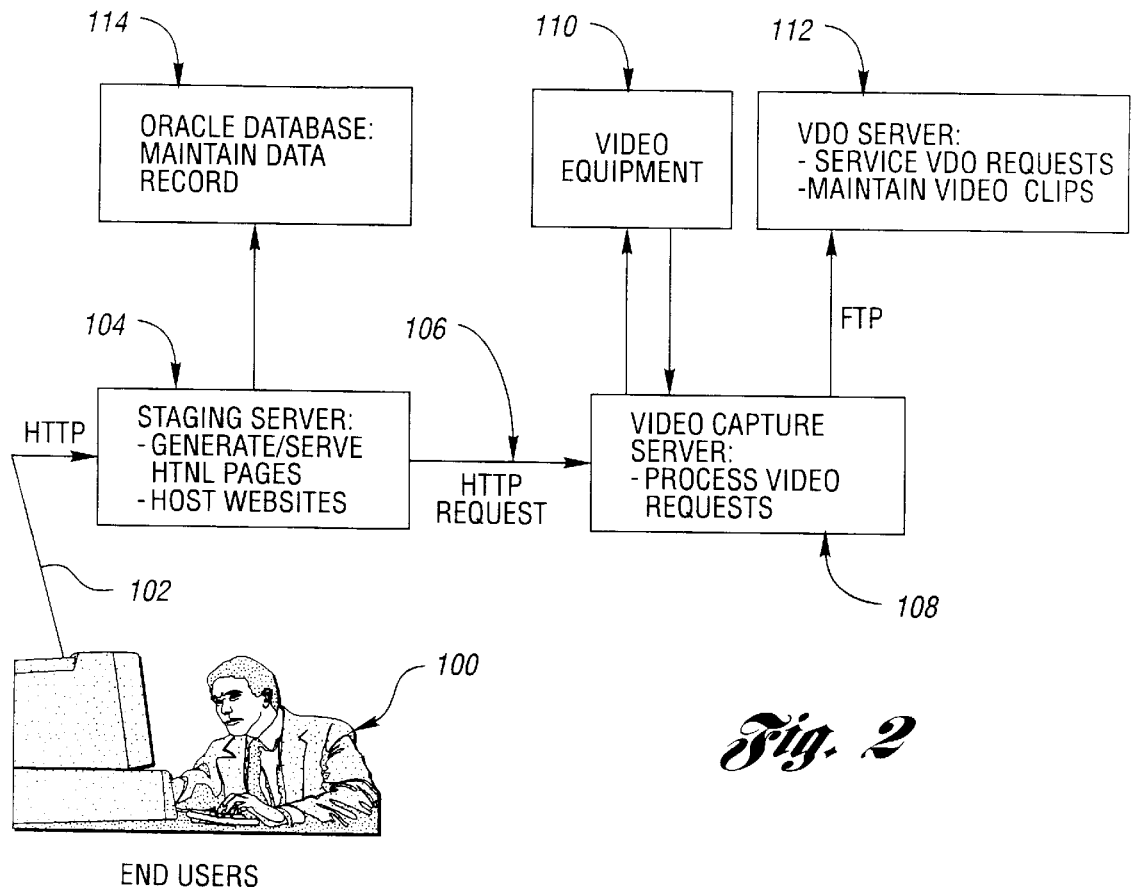
FIG. 2 is a flow chart showing a video input and management process in accordance with the present invention.

FIG. 2 is a flow chart showing the overall video input and management process in accordance with the present invention. Initially, background information for each input analog video signal is entered at block 100. Input of this background is preferably done via a prearranged input form created in a graphical user interface (GUI) type interface, such as a web-based user interface. Examples of the type of background information input at block 100 include a category for which the associated analog video information relates, time and date of the video information, a start and stop time denoting the length of time for the associated analog video clip/information, a title, a text description to be associated with the analog video information, and a designation of the type of video format to be employed, i.e., jpg, mpg, etc.

If the input information is valid and in proper form, the information is forwarded to the staging and delivery server 22 via an "http" (Hypertext Transport Protocol) request as shown at block 102. Server 22 subsequently validates the input background information again, and then creates a directory in which to save the associated information and all relevant files associated with the information. For example, the directory can be named based on the date of the video information. In other words, if the video information were a news story broadcast on Jun. 10, 1997, the directory structure and naming scheme for that story could be of the form "11997/06/10". This directory will be relative, or a subdirectory, to the "root" directory of the web server itself.

In the preferred embodiment, the directory naming scheme is of the form "HHHHCCNN.ext", where "HHHH" is the hour of the video information broadcast, using a 24-hour (military time) method. The "CC" is a two-character mnemonics used for the category of the story, and the "NN" is a sequential number ranging from "01" to "99" in order to assure a unique name to each input video clip/segment. For example, if a news story were broadcast on May 21, 1997 at 10:00 AM destined for the Sports category page and being the first sports related story for the 10:00 AM show, then the associated video segment would have the name "1000sp01" and would be stored in the directory 1997/05/21. This entire process is handled automatically by server 22, and is generally denoted at block 104.

As shown at block 106, a request is made to the capture and encoding subsystem 12 via an "http" request, to capture and encode the appropriate video segment at block 108. This request is received and processed by subsystem 12 which then receives the analog video information at block 110, compresses the video in accordance with known compression techniques, and sends the compressed video segment to the web server at block 112 to be stored in the same directory with all other related/associated files.

In addition, at block 114, server 22 initiates maintenance and updating of the archive database. During this stage of the process, all relevant information pertaining to the current video information is inserted into the archive database. As noted previously, this database is used in conjunction with a search engine to maintain the location of each video clip/segment and associated information. In the preferred embodiment, when a user wishes to search the archives for a particular video segment(s), the archive database will provide the location and web-based links necessary to access the requested video segment(s). The present invention can be readily adapted to permit multiple database server vendors to operate as the archive database.

In order to provide processing consistency, individual files generated by the present invention preferably maintain the same naming scheme as their associated video segment. For example, for the above-noted file "1000sp01", a file named "1000sp01.html" designates a web server story file generated to contain the actual script and information which will visually appear on the web page. This file also controls the placement and size of any relevant images or web links related to that story. A file named "1000sp01.jpg" or "1000sp01.mpg" denotes image extensions used for the video segment. Each extension refers to a different image format and technology, and may be multiple in nature. A file named "1000sp01.vdo" or "1000sp01.ram" refers to the type of video server used to play the video segment. The present invention allows for multiple video server formats in order to accommodate future changes in video technology and vendor/customer requirements. Finally, a file named "1000sp01.AVI" denotes the actual compressed video segment, and can vary depending on the type of technology used for the video capture and encoding process. The present invention allows for multiple capture/encoding formats which will be determined and requested by the analog video provider at the time of data input.

Figure 3:
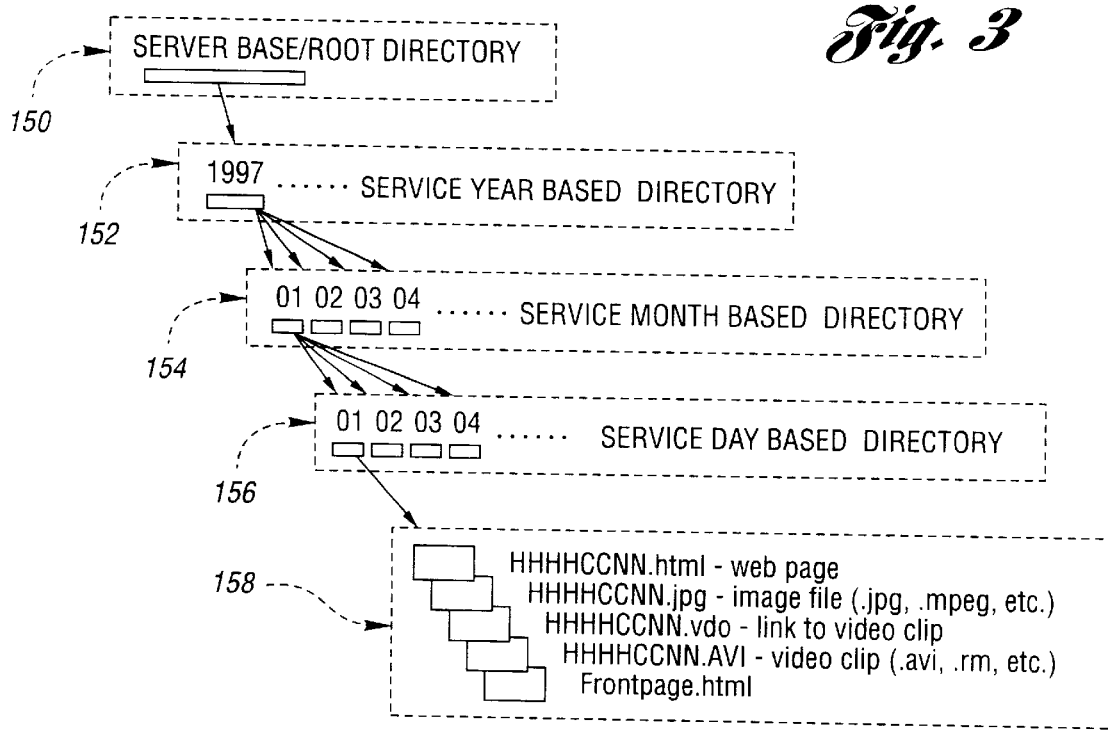
FIG. 3 shows an example of a digital video file storage scheme.

FIG. 3 provides a graphical view of a file storage protocol in accordance with the present invention. For example, all the directory files for a video news story input on Jun. 10, 1997, will reside at a server base/root directory, 1997/06/10, as denoted at blocks 150, 152, 154, and 156. The associated files are shown at block 158.

FIG. 4 is a block diagram showing a preferred embodiment for video capture and compression encoding subsystem 12 in accordance with the present invention. In general, subsystem 12 is arranged to receive requests for video files, capture raw, uncompressed video clips into digital video files, compress the video files, and output them to a web server, or other suitable Internet type server. Subsystem 12 includes suitable programming to provide automatic capture and conversion of analog video/audio sources to digital files that can be distributed via an Internet connection/interface. More specifically, a media request service 200 receives requests 106 to process analog video clips. A request 106 specifies the parameters needed by the rest of the system 10 to produce a digital video file. A capture process 202 controls the media input source(s) 14 and produces digital files from the analog inputs. A compression process 204 receives the digital files from the capture process 202 and reduces their size by compressing them. A plurality of processors 206 can be used to implement the compression process, wherein the number is dependent on the size and design of the system. The digital video files are then sent to one or more web servers 208. Each component of subsystem 12 is further described hereinbelow in context with FIGS. 5–7.

FIG. 5 illustrates the media request service 200 in more detail. In general, the media request service 200 receives the requests for video files, and stores them in files which are used by the capture and compression processes 202 and 204. Requests to system 10 are made via the Hypertext Transfer Protocol (HTTP) to service 200, which operates as part of an Internet information server. In an exemplary embodiment, media request service 200 is implemented as an Internet Server API (ISAPI) dynamic link library (DLL) 210. An ISAPI DLL is invoked from a browser application, or any other application which supports HTTP. The request for a digital media file can include the following information:
A) Source of video file;
B) File name;
C) Start time;
D) Stop time;
E) Frame rate;
F) Frame size;
G) Color depth;
H) Audio settings;
I) Compression method;
J) Compression settings;
K) Output server name;
L) Output server destination;
M) Priority; and
N) Redirection location.

Media request service 200 is arranged to parse the HTTP request, extract the various parameters of the request, and store the results in a file 212. Service 200 also logs all of its activity to a log text file 214 so its progress can be monitored. Finally, the media request service 200 redirects the HTTP request to another server so the process that initiated the request can complete its functions.

Figure 6:
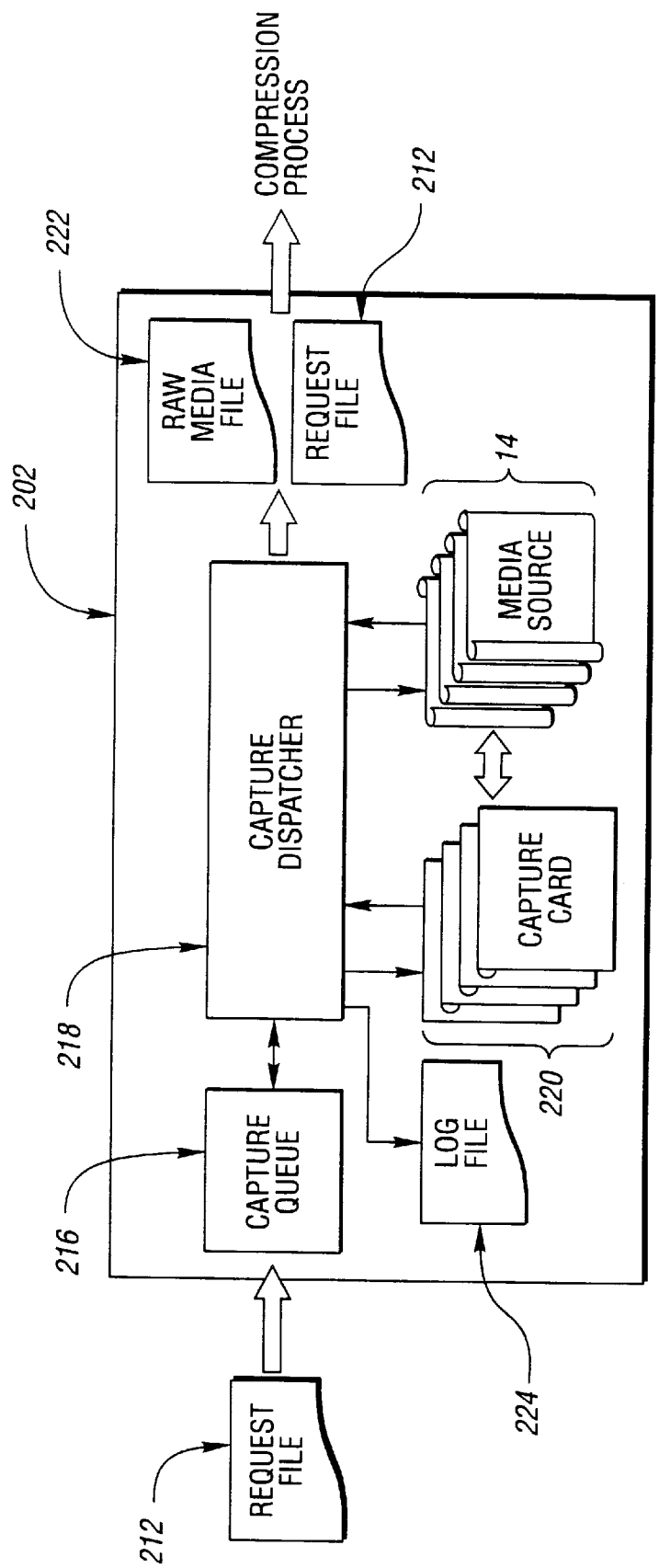
FIG. 6 is a block diagram of the capture process of FIG. 4.

FIG. 6 illustrates the capture process 202 in more detail. As noted previously, capture process 202 is responsible for capturing media files specified by the request files 212 created from the media request service 200 and forwards them to the compression process 204. Capture process 202 monitors a network directory where media request service 200 stores the request files 212. When a new request file is discovered, a capture entry is made in a capture queue 216 with all the parameters needed to complete a media capture. Entries in the queue can be ordered by priority, start time, segment length, or by using a simple first in, first out scheme. The system can be adapted to allow the user to adjust or control how the queue is ordered.

A capture dispatcher 218 takes the capture entry from the top of the queue and performs the capture. By using the parameters specified in the request file, capture dispatcher 218 selects an appropriate capture card 220, and media source(s) 14. Capture dispatcher 218 also synchronizes the media source with the capture by setting the start and stop times of the media device. The capture card 220 captures and converts the analog media source and saves it to a digital file. When the capture is completed, the captured raw media file 222 is forwarded to the compression process 204 by performing a network copy to the machine where the process resides. The request file 212 is also forwarded to the compression process 204 in order to convey the necessary compression parameters and final output destination. Capture process 202 also logs all of its activity to log text file 224 so its progress can be monitored.

If system 10 is configured with several processors/capture cards/media sources, the dispatcher 218 can be arranged to utilize each resource to provide for multiple, concurrent captures. If resources for a request are not currently available, the capture entry will be placed back in the capture queue.

Figure 7:
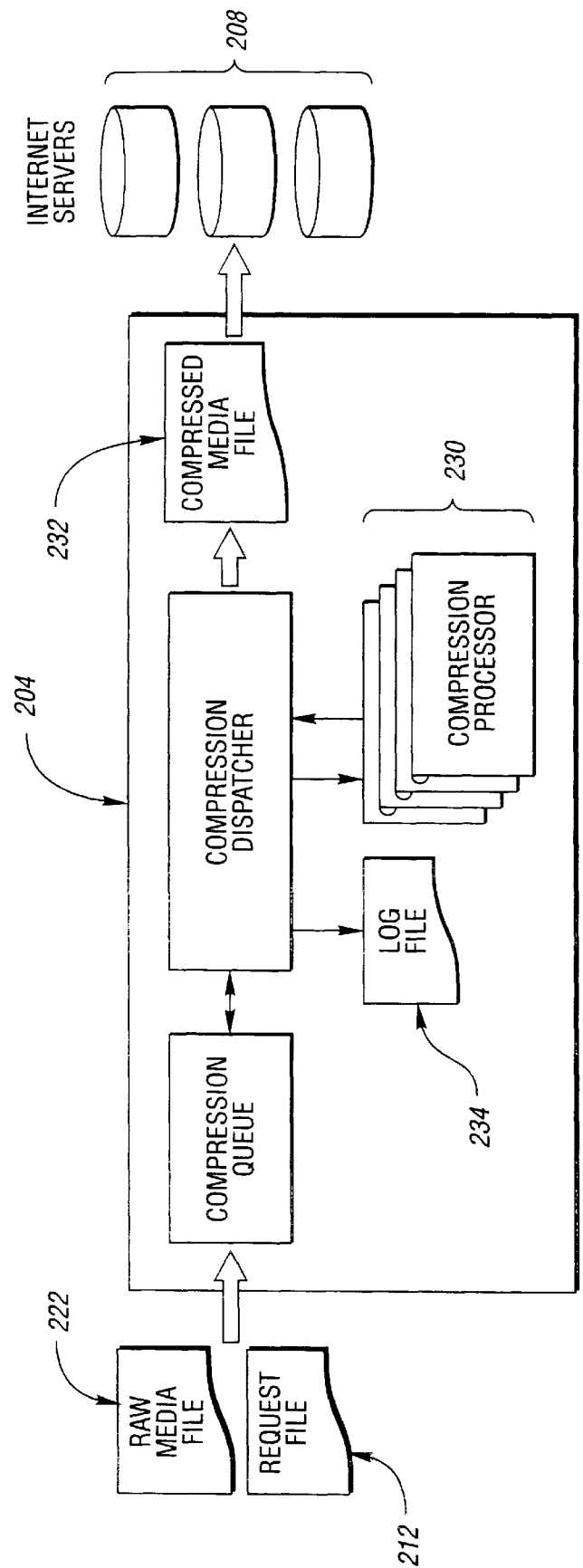
FIG. 7 is a block diagram of the compression process of FIG. 4.

As shown in FIG. 7, compression process 204 receives the raw media files 22 from capture process 202, compresses them using the compression scheme specified in the request file, and places the compressed file on an Internet server. While not to be construed as limiting, several processors 230 can be configured to allow several files to be compressed at the same time, thereby decreasing the amount of time required for compression.

When a new raw media file 222 is discovered by compression process 204, a compression entry is made in a compression queue 226. Entries in the queue can be ordered by priority, start time, segment length, or by using a simple first in, first out scheme. The system can also be adapted to allow the user to adjust or control how the compression queue 226 is ordered. A compression dispatcher 228 takes a compression entry from the top of the compression queue and performs the indicated compression. By using the parameters specified in the request file 212, compression dispatcher 228 selects the appropriate compression method to use and selects a processor 230 for the compression. The dispatcher 228 only processes entries when processing power is available.

Compression techniques vary for the type of compression required. For methods that have an API (Application Program Interface), such as Real Video, dispatcher 228 creates a thread that will perform the compression. For methods that have no API, such as VDO, dispatcher 228 launches a separate program supplied by VDO that performs the compression.

When the compression is completed, the compressed media file 232 is copied to the Internet server 208 and location specified in the request file 212 by using FTP (file transfer protocol). Compression process 204 also logs all of its activity to a log text file 232 so its progress can be monitored.

Thus, the present invention provides a way of automatically archiving and distributing audio/video segments via GUI/web-based Internet connections. To allow customized control of distribution process, authorizing station 26 provides a GUI type mechanism wherein certain web-related administrative and maintenance functions can be performed. For example, station 26 can provide a producer interface having various administrative/maintenance menus which permit review of video segments already entered into a system output web site for the current and previous days. In addition, a menu selection can be provided to allow video segments to be removed from the web site without removing them from the archive database, thereby allow for access of the removed video segments in future archive searches. Such itemized control allows a producer flexibility in maintaining web pages and eliminates the need to remove all video segments currently being distributed on an Internet web page simply to update that particular page.

Another menu can be provided to allow updating of the web sites' category pages. Such a menu can activate a background process on a web server, which in turn gathers all video segments input for a given period of time and automatically generates a new "category" page. Each category page will now include all the video segments related to each particular category. When the web user selects a category button from a home page, he or she will now see all video segments input for a given category. It is preferable to update all category pages whenever video segments are entered or removed from the output web site to reflect the addition or deletion of any such video segments.

Yet another menu can be provided to allow all segments and pages which have been input and reviewed to be made available for public viewing. Such a menu can activate a background process on a web server to move all newly generated pages to a production/delivery phase. These pages would then be available to the public on a web site.

Still another menu can be provided to allow removal of video files from the archive database at the same time they are deleted from an output web page. This assures that stories can be permanently removed from the system.

As a final example, a menu can be provided which allows verification that all video segments input for an output web page can also be found by the archive database. This menu would allow a producer to verify and cross check that all video clips input for that day can be found in both the web site and also the archive database.

While the best mode for carrying out the invention has been described in detail, those familiar with the art to which this invention relates will recognize various alternative designs and embodiments for practicing the invention as defined by the following claims.

What is claimed is:

1. A method for distributing digital audio or video information comprising the steps of:

translating an input analog signal into at least one digital signal segment;

automatically correlating the at least one signal segment with identifying data received from an Internet connection;

storing the correlated at least one signal segment and identifying data in a storage device;

selecting at least one stored signal segment for distribution to a user terminal;

formatting the at least one selected signal segment for output on an Internet connection; and sending the at least one selected signal segment to the user terminal via the Internet connection, wherein said translating step comprises:

receiving a request to capture an analog signal;

extracting a plurality of capture parameters from the received request; and capturing the analog signal in accordance with the plurality of extracted parameters to effect translation of the analog signal into the at least one digital signal segment.

2. The method of claim 1 wherein said capture request is automatically generated in response to receipt of the identifying data received from the Internet connection.

3. The method of claim 1 further comprising the step of compressing the at least one digital signal segment before storing in the storage device.

4. The method of claim 3 further comprising transmitting the GUI interface on a broadband communication network.

* * * * *